J. B. WRIGHT.
Scroll-Saws.
No. 146,118.  Patented Dec. 30, 1873.
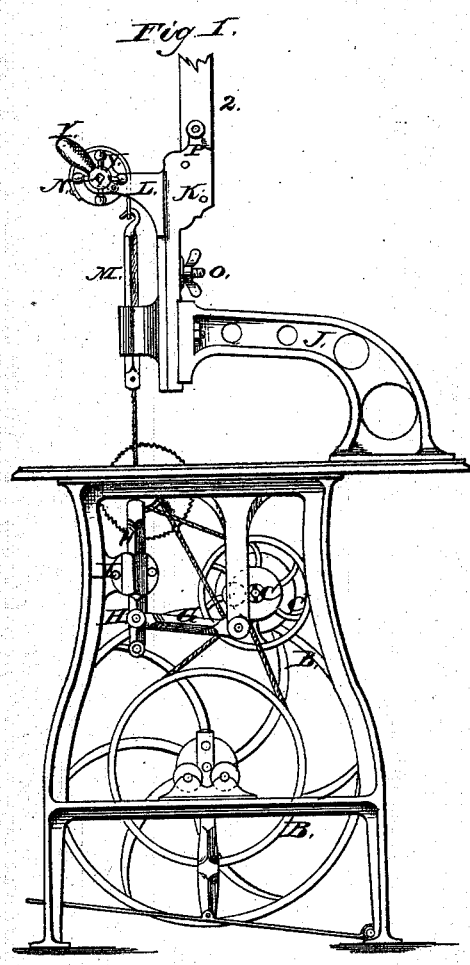
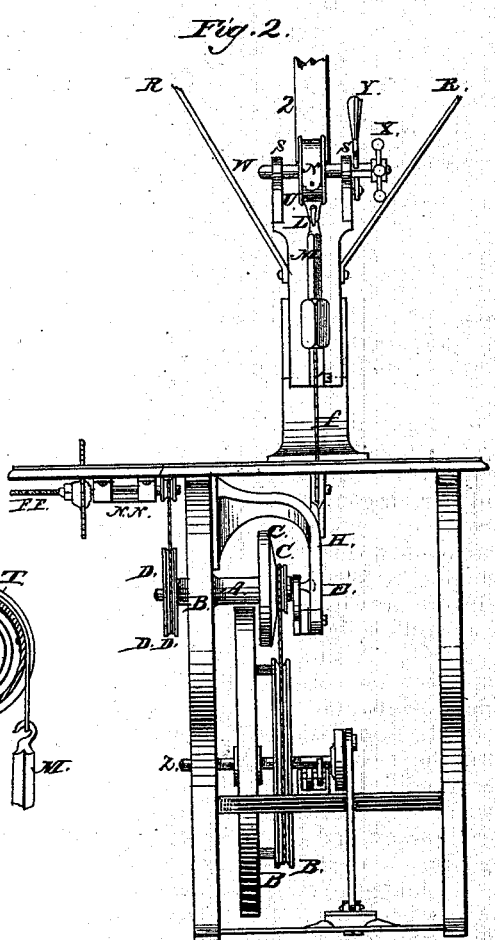
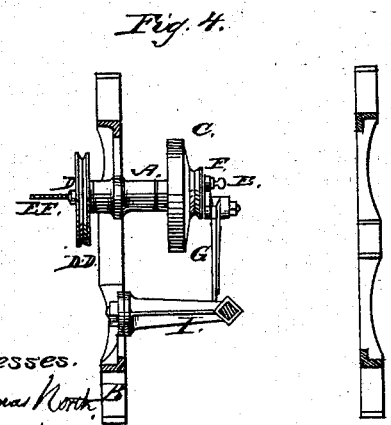
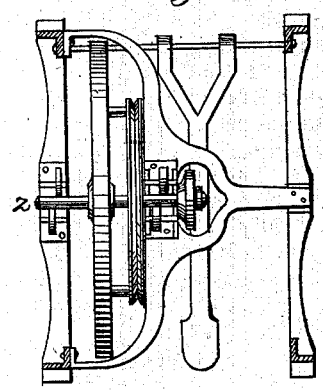

UNITED STATES PATENT OFFICE.

JOSEPH B. WRIGHT, OF JERSEY CITY, NEW JERSEY.

IMPROVEMENT IN SCROLL-SAWS.

Specification forming part of Letters Patent No. 146,118, dated December 30, 1873; application filed March 27, 1873.

*To all whom it may concern:*

Be it known that I, JOSEPH B. WRIGHT, of Jersey City, Hudson county, in the State of New Jersey, have invented certain Improvements in Scroll-Saws for Sawing Wood, Metal, Bone, Ivory, and other material, of which the following is a specification:

This invention consists in a novel arrangement of the connections between the jig-saw and a driving-crank, whereby a long and quick stroke of the saw is obtained from a short crank, and a very effectively-operating sawing-machine for scroll-sawing is obtained.

In the drawing, Figure 1 is a side elevation of a scroll or jig saw, showing the side frame, arm, or brace supporting the upper head, to which is attached the adjustable head, adjustable tension, and upper saw-gate. Fig. 2 is a front elevation, showing position of the same with the treadle, pitman, balance-wheel, and speed-pulley. Fig. 3 is a plan of the brace or bearing for carrying the balance-wheel and speed-pulley, and for securing the side frames together. Fig. 4 is a plan of the bearing A cast or bolted to the side frame B for carrying the balance-wheel C, and crank-shaft D, to which is attached, by the crank-pin E, the link F, and lever-arm G acting on the lower saw-gate H, which is held in position by the guide-arm I attached to the side frame B.

In Fig. 1, J is the arm or brace supporting the upper head K, to which is attached the adjustable head L, carrying the upper saw-gate M, and the adjustable band-spring tension N. The adjustable head L is so constructed that it can be raised or lowered to suit various lengths of saws, and held in position by the thumb-bolt O. To the socket P is bolted the stanchion Q, running and secured to the ceiling, and retained in position by the brace-rods R R, so that, if desired, the arm or brace J may be removed, leaving the table entirely clear for sawing large articles. The tension N is composed of a shaft resting on the bearings S S, in the center of which is fastened the central end of the band-spring T inclosed in the case or pulley U, to which is fastened the outer end of the spring, and, with the cover V, forming a pulley rotating on the shaft W to the corresponding stroke of the upper saw-gate M.

In Fig. 2, X is the hand-wheel for tightening or loosening the spring, and Y the lock-lever to secure the shaft from turning, the whole operated by the treadle and pitman attached to the lower crank-shaft Z, which carries the balance-wheel and speed-pulley B B, or may be driven by power, where available, by belting onto the speed-wheels B B or C C. By removing the crank-pin E the speed is then conveyed to the circular-saw mandrel N N by means of the speed-pulley D D. The jig or scroll saw being detached, the full power is thus given to the circular saw in the end of the mandrel, of which is inserted the drill F F for making the necessary holes through which to pass the saw for inside sawing.

What I claim as my invention, and desire to secure by Letters Patent, is—

A sawing-machine having its various parts constructed and arranged for joint operation, in the manner and for the purpose herein set forth.

JOSEPH B. WRIGHT.

Witnesses:
 THOMAS NORTH,
 E. J. FORBES.